(12) United States Patent
Dai

(10) Patent No.: US 8,319,911 B2
(45) Date of Patent: Nov. 27, 2012

(54) ATTACHMENT FRAME FOR A DISPLAY MODULE AND PORTABLE ELECTRONIC DEVICE USING THE SAME

(75) Inventor: Bin Dai, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 123 days.

(21) Appl. No.: 12/961,701

(22) Filed: Dec. 7, 2010

(65) Prior Publication Data

US 2012/0044437 A1      Feb. 23, 2012

(30) Foreign Application Priority Data

Aug. 18, 2010   (CN) .......................... 2010 1 0256341

(51) Int. Cl.
*G02F 1/1333*     (2006.01)

(52) U.S. Cl. ......................................................... 349/58
(58) Field of Classification Search ...................... 349/58
See application file for complete search history.

(56) References Cited

U.S. PATENT DOCUMENTS 7,492,421 B1 * 2/2009 Kim et al. ....................... 349/58
2011/0007235 A1 * 1/2011 Chang ............................. 349/58

* cited by examiner

*Primary Examiner* — Wen-Ying P Chen
(74) *Attorney, Agent, or Firm* — Altis Law Group, Inc.

(57) ABSTRACT

An attachment frame for a display module includes a bezel at a periphery of the display module, and at least one pair of tabs positioned in a plurality of inner sides of the bezel. Each tab includes a fixing portion welded to the bezel and a mounting portion fixed to the display module. The fixing portion forms two positioning posts, and the bezel defines two corresponding positioning holes, and the tabs are positioned relative to the bezel via the engagement of the positioning posts and the corresponding positioning holes.

10 Claims, 4 Drawing Sheets ary and defines a
ATTACHMENT FRAME FOR A DISPLAY MODULE AND PORTABLE ELECTRONIC DEVICE USING THE SAME

CROSS-REFERENCE TO RELATED APPLICATION

This application is related to two co-pending U.S. patent application Ser. Nos. 12/961,697 and 12/961,695, and both entitled "ATTACHMENT FRAME FOR A DISPLAY MODULE AND PORTABLE ELECTRONIC DEVICE USING THE SAME". The inventor of the above co-pending applications is Bin Dai et al. The co-pending applications have the same assignee as the present application. The disclosures of the above-identified applications are incorporated herein by reference.

BACKGROUND

1. Technical Field

The present disclosure generally relates device mounting, and specifically to an attachment frame for a portable electronic device, and a portable electronic device using the attachment frame.

2. Description of the Related Art

As a result of increased demand for smaller portable electronic devices and improvements in performance thereof, reduction of the external dimensions of such devices along with increased display size have been prioritized, particularly in smaller portable electronic devices using liquid crystal panels, including tablet computers.

Liquid crystal panels are often attached to a housing of a tablet computer by a bracket. The bracket includes a main connecting part and a plurality of tabs fixed to the periphery thereof. The main connecting part and the tabs define a plurality of first mounting holes, and the display and the housing define a plurality of second mounting holes corresponding thereto. The liquid crystal panel, the bracket, and the housing are fixed together by a plurality of fasteners received in the corresponding first and second mounting holes. The main connecting part and the tabs are welded together, and positioned by a special clamping device, thereby creating difficulty in precise positioning.

Therefore, there is room for improvement within the art.

BRIEF DESCRIPTION OF THE DRAWINGS

The components in the drawings are not necessarily drawn to scale, the emphasis instead placed upon clearly illustrating the principles of the present disclosure.

DETAILED DESCRIPTION

Figure 1:
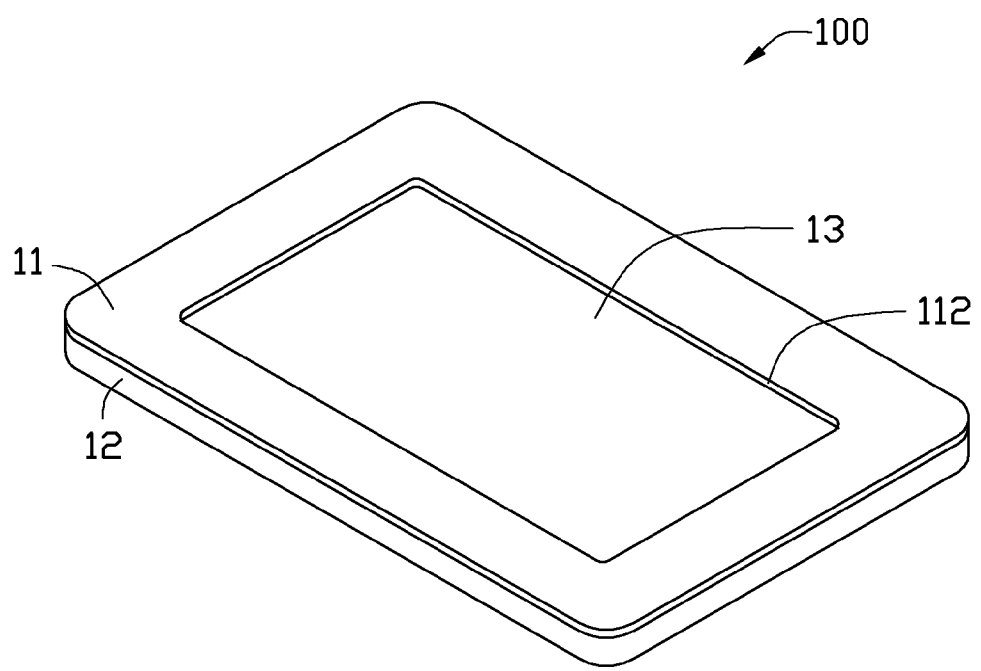
FIG. 1 is an assembled, isometric view of an embodiment of a portable electronic device including a bezel, a rear cover, a display module, and an attachment frame.
Figure 2:
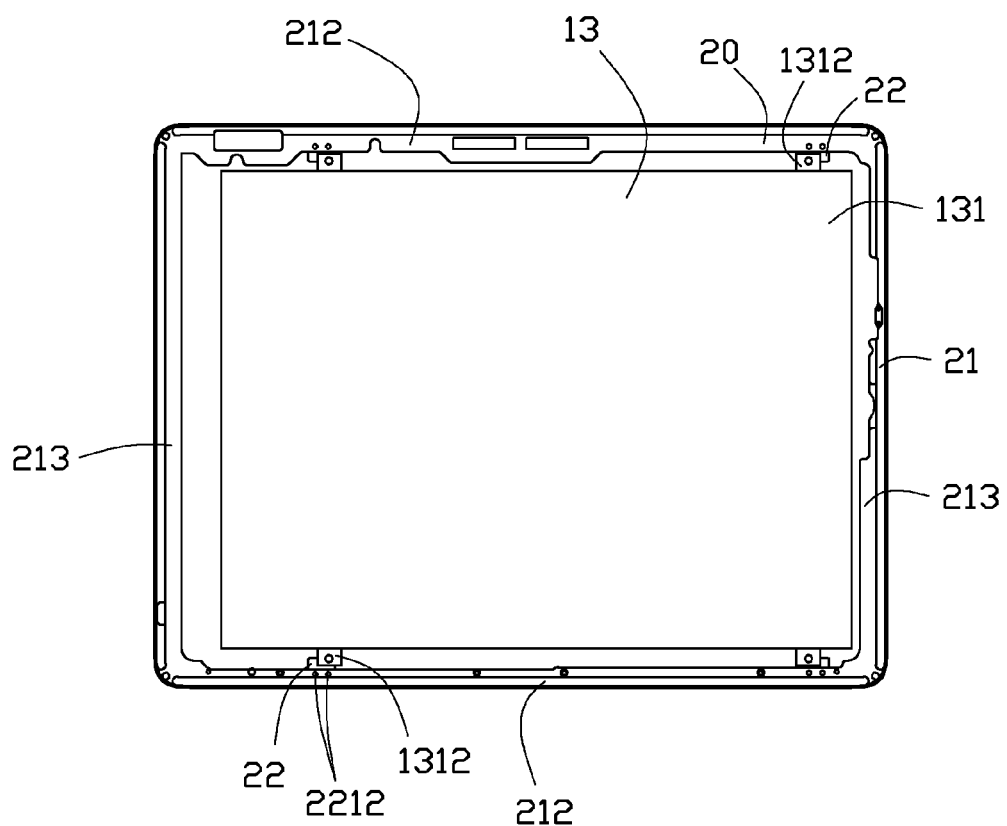
FIG. 2 is a plan view of the display module and the attachment frame of FIG. 1, with the bezel not shown.
Figure 3:
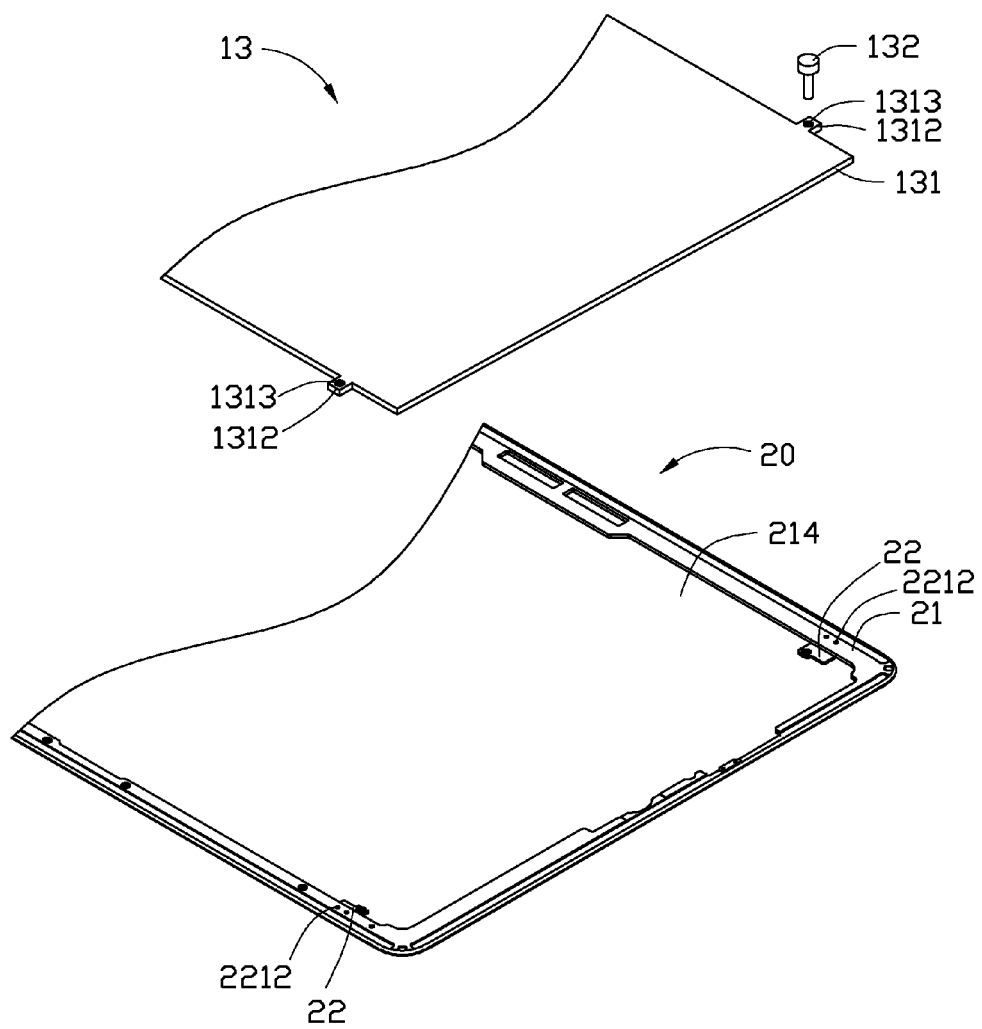
FIG. 3 is a partial, exploded, isometric view of the display module and the attachment frame of FIG. 2.

Referring to FIGS. 1 through 3, one embodiment of a portable electronic device 100 is a tablet computer including a first bezel 11, a rear cover 12, a display module 13, and an attachment frame 20 for attaching the display module 13 to the rear cover 12.

The first bezel 11 is substantially rectangular and defines a rectangular opening 112 for exposing the display module 13. The first bezel 11 is fixed to the rear cover 12 so as to cooperatively define a receiving chamber (not labeled) therebetween to receive the display module 13.

The display module 13 includes a liquid display panel (not shown), a light guide plate (not shown), a light reflection plate (not shown), a light diffusion plate (not shown), and an outer frame 131 for securing the components. The outer frame 131 includes four protruding portions 1312 extending from the periphery thereof. Each protruding portion 1312 defines a first mounting hole 1313.

Figure 4:
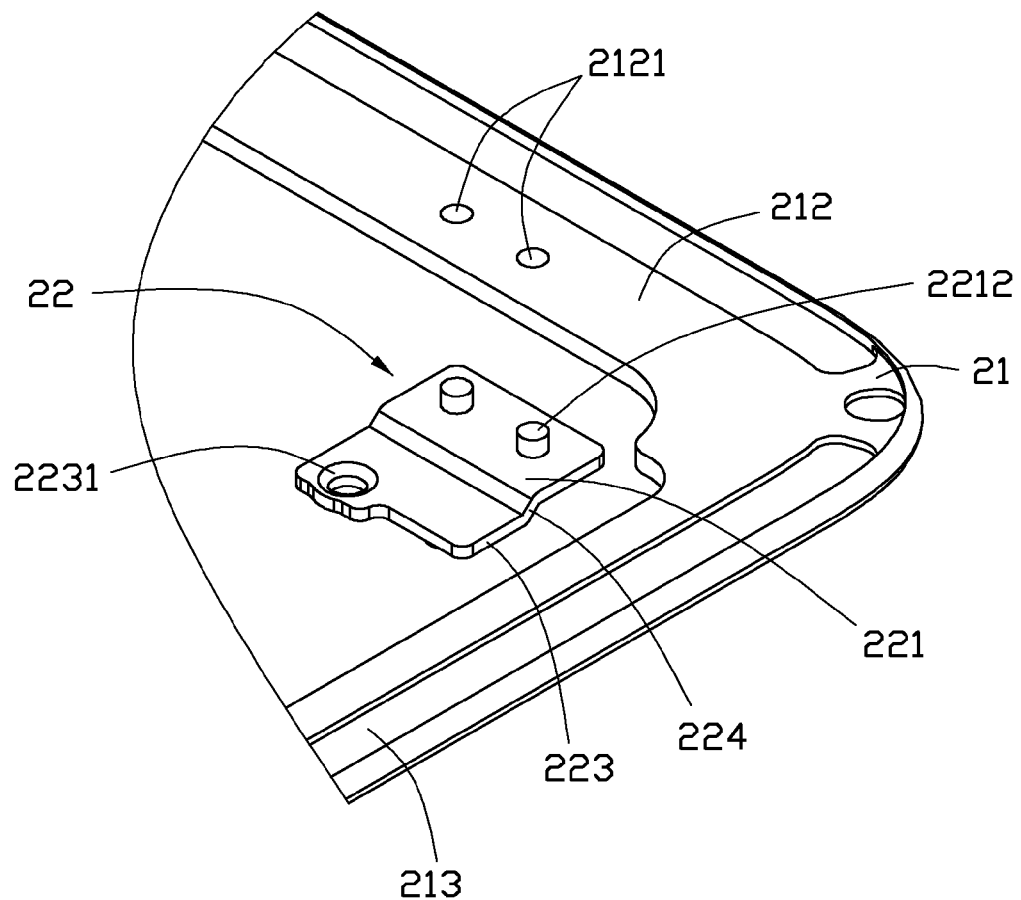
FIG. 4 is a partial, isometric view of one embodiment of an attachment frame, such as, for example, the attachment frame in FIG. 2.

Referring also to FIG. 4, the attachment frame 20 includes a second bezel 21 and two pairs of tabs 22. The tabs 22 are positioned on a plurality of inner sides of the second bezel 21. The attachment frame 20 attaches the display module 13 to the rear cover 12 and positions the display module 13 in the receiving chamber defined by the first bezel 11 and the rear cover 12.

The second bezel 21 is a substantially rectangular frame and includes a plurality of opposite first sidewalls 212 and a plurality of opposite second sidewalls 213. The first and second sidewalls 212, 213 cooperatively define a receiving bay 214. The receiving bay 214 has dimensions exceeding those of the display module 13 so as to receive the display module 13.

The tabs 22 cooperatively support the display module 13. Each tab 22 includes a fixing portion 221, and a mounting portion 223 fixed to the display module 13, and a connecting portion 224 connecting the fixing portion 221 and the mounting portion 223. The mounting portion 223 extends inwardly and is substantially flat and parallel to the second bezel 21.

The second bezel 21 defines a plurality of positioning holes 2121, and each tab 22 forms a pair of positioning posts 2212 correspondingly on the fixing portion 221. The tabs 22 are fixed to the second bezel 21 by welding. During welding, the positioning posts 2212 are engageably received in the corresponding positioning holes 2121, such that the tabs 22 can be positioned relative to the second bezel 21 with no need for additional clamping or positioning devices, thereby with cost reduced and precision increased.

In the illustrated embodiment, the positioning posts 2212 and the positioning holes 2121 have circular cross-sections and are formed by stamping.

In other embodiments, each tab 22 can form only one positioning post 2212 of non-circular cross-section, such as curved and polygonal cross-sections, and to be able to be positioned by only one positioning post 2212 and the corresponding positioning hole 2121. It should be understood that in alternative embodiments, the positioning holes 2121 can be formed on the tabs 22, and the positioning posts 2212 are then formed on the second bezel 21.

The mounting portion 223 defines a second mounting hole 2231 corresponding to the first mounting holes 1313 of the protruding portions 1312. The display module 13 is received in the receiving bay 214, and a plurality of fasteners 132 pass through the corresponding first and second mounting holes 1313, 2231 to be engageably received in the tabs 22, thus fixing the attachment frame 20 to the rear cover 12. It should be understood that the mounting portion 223 also can be fixed to the display module 13 by other means, for example, by means of a plurality of assembly holes defined in the display module 13 and a plurality of pins formed on the mounting portions 223 and received in the corresponding assembly holes to fix the tabs 22 to the display module 13.

It is believed that the present embodiments and their advantages will be understood from the foregoing description, and it will be apparent that various changes may be made thereto without departing from the spirit and scope of the embodiments or sacrificing all of its material advantages.

What is claimed is:

1. An attachment frame for a display module, the attachment frame comprising:
a bezel arranged in a periphery of the display module; and
at least one pair of tabs positioned in a plurality of inner sides of the bezel, wherein each of the at least one pair of tabs comprises a fixing portion welded to the bezel and a mounting portion fixed to the display module, one of the bezel and each of the at least one pair of tabs defines at least one positioning hole, while the other one correspondingly forms at least one positioning post, and each of the at least one pair of tabs is positioned relative to the bezel via an engagement of the at least one positioning hole and the at least one positioning post, wherein each of the at least one pair of tabs forms a positioning post on the fixing portion, and each of the positioning post and each of the at least one positioning hole has a non-circular cross-section.

2. The attachment frame of claim 1, wherein each of the positioning post and each of the positioning hole has a curved cross-section.

3. The attachment frame of claim 1, wherein each of the positioning post and each of the positioning hole has a polygonal cross-section.

4. The attachment frame of claim 1, wherein the bezel is substantially parallel to the mounting portion.

5. The attachment frame of claim 1, wherein each of the positioning hole and each of the positioning post is formed by stamping.

6. The attachment frame of claim 1, wherein the bezel is substantially rectangular and comprises a plurality of opposite first sidewalls and a plurality of opposite second sidewalls, and the first and the second sidewalls cooperatively define a receiving bay to receive the display module.

7. A portable electronic device comprising:
a rear cover;
a first bezel fixed to the rear cover, and the first bezel and the rear cover cooperatively define a receiving chamber;
a display module received in the receiving chamber; and
an attachment frame attaching the display module to the rear cover, the attachment frame comprising:
a second bezel arranged in a periphery of the display module; and
at least one pair of tabs positioned in a plurality of inner sides of the second bezel, wherein each of the at least one pair of tabs comprises a fixing portion welded to the second bezel and a mounting portion fixed to the display module, one of the second bezel and each of the at least one pair of tabs defines at least one positioning hole, while the other one correspondingly forms at least one positioning post, and each of the at least one pair of tabs is positioned relative to the second bezel via an engagement of the at least one positioning hole and the at least one positioning post, wherein each of the at least one pair of tabs forms a positioning post on the fixing portion, and each of the positioning post and each of the at least one positioning hole has a non-circular cross-section.

8. The portable electronic device of claim 7, further comprising a plurality of fasteners, wherein the display module comprises an outer frame forming a plurality of protruding portions protruding from a periphery thereof, each of the plurality of protruding portions defines a first mounting hole, the mounting portion defines a plurality of second mounting holes corresponding to the first mounting hole of each of the plurality of protruding portions, and each of the plurality of fasteners is received in the the first mounting holes of each of the plurality of protruding portions and in each of the plurality of second mounting holes and is engaged in each of the at least one pair of tabs.

9. The portable electronic device of claim 8, wherein each of the positioning post and each of the positioning hole has a curved cross-section.

10. The portable electronic device of claim 8, wherein each of the positioning post and each of the positioning hole has a polygonal cross-section.

\* \* \* \* \*